United States Patent [19]

Bachmann

[11] Patent Number: 4,848,803

[45] Date of Patent: Jul. 18, 1989

[54] FABRIC EXPANSION JOINTS FOR EXHAUST SYSTEMS OF GAS TURBINES

[75] Inventor: Lothar Bachmann, Auburn, Me.

[73] Assignee: Bachmann Industries, Inc., Lewiston, Me.

[21] Appl. No.: 96,942

[22] Filed: Sep. 15, 1987

[51] Int. Cl.[4] .............................................. F16L 11/12
[52] U.S. Cl. ..................................... 285/47; 285/114; 285/224; 285/229
[58] Field of Search ................. 285/229, 47, 114, 224, 285/363

[56] References Cited

U.S. PATENT DOCUMENTS 3,730,566  5/1973  Kazmierski et al. ................ 285/229
4,299,414  11/1981  Bachmann ............................ 285/187

FOREIGN PATENT DOCUMENTS 2927639  1/1981  Fed. Rep. of Germany ...... 285/229
582435  11/1977  U.S.S.R. ............................... 285/229

Primary Examiner—Dave W. Arola

[57] ABSTRACT

Fabric expansion joints suitable for use in the exhaust systems of gas turbines are of three types definable with reference to whether a frame is to be connected to a duct section which is externally insulated or one which is internally insulated. In joints where only the outlet frame or where both the inlet and outlet frames are to be connected to internally insulated sections, the flanges of the liners are connected to their frames in a manner preventing movement of the liners relative to the axis of the flow path through the joint but permitting thermal flange growth relative to the frames. Where a frame is to be connected to an externally insulated duct, the frame includes structure spaced from the flange of the liner which defines therewith an inwardly opening, thermal distribution channel. In each type, the free ends of the liners overlap in a spaced apart relationship and are interconnected in a manner permitting relative lengthwise movement between them. The liners support thermal insulation with the disclosed type consisting of or including a fiber glass blanket within a stainless steel, wire mesh sleeve folded to form a double layer with the wire mesh at its folded over margins interconnected and the insulation connected to the liners.

17 Claims, 5 Drawing Sheets

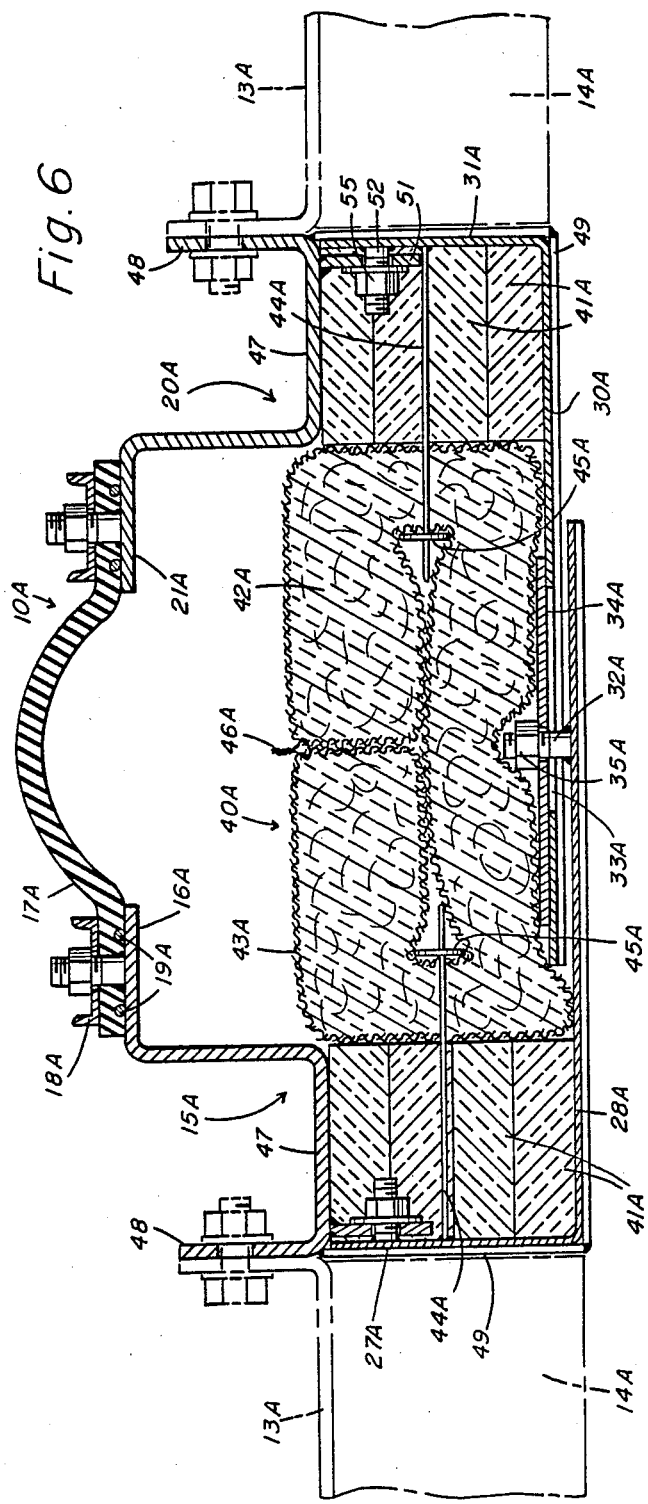

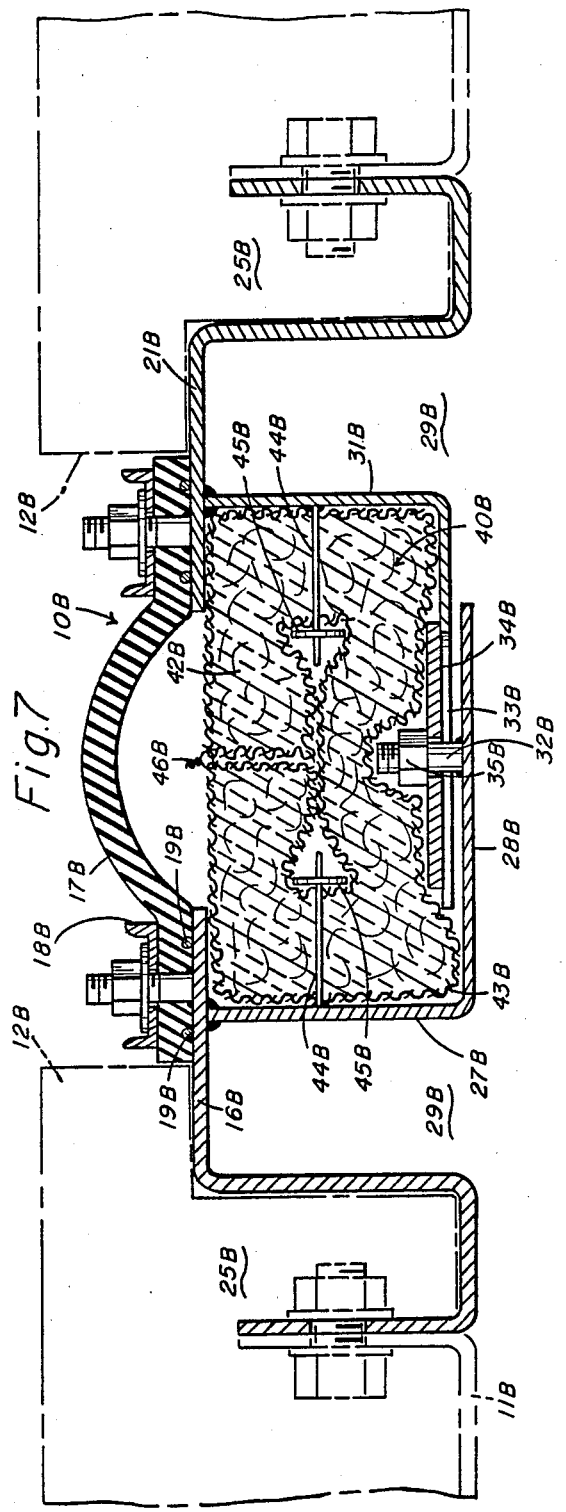

FABRIC EXPANSION JOINTS FOR EXHAUST SYSTEMS OF GAS TURBINES

BACKGROUND OF THE INVENTION

While fabric expansion joints are widely used in various systems, the exhaust systems of gas turbines present problems not satisfactorily met by expansion joints prior to the present invention.

Such problems arise from the fact that temperatures rise so rapidly as a turbine is started as to cause thermal shock a consequence of which may be the cause of cracked frames. Unless a joint ensures proper distribution of the high temperatures between the liners and the frames, binding and warping as well as the cracking of frames and liners may result. In addition, temperature differentials between internally and externally insulated duct secions of the system must be accommodated.

The various temperatures of the metal components of the joints and the different anchoring and mounting requirements of such components typically result in the requirement that expansion joints must be capable of absorbing not only axial movements but also movements in any direction normal to the flow path through the joint.

While the insulation of fabric expansion joints for use in the exhaust systems of gas turbines present particular requirements, it is the metal components of the joints that present major problems to the provision of joints capable of providing suitably long periods of proper service.

THE PRESENT INVENTION

The general objective of the present invention is to provide fabric expansion joints for use in connecting sections of the exhaust system of gas turbines in a manner overcoming the problems and difficulties to which reference has previously been made.

Duct sections which are externally insulated are obviously hotter than ones internally insulated so that in practise three types of fabric expansion joints are required for most installations. In one type, an inlet frame is connected to an externally insulated or hot duct and the outlet frame of that joint is connected to an internally insulated duct section herein referred to as a cold duct. Such a joint is identified as a hot frame to cold frame joint. Another type of joint is for use where both of the duct sections which a joint is to connect are internally insulated. Such a joint is a cold frame to cold frame joint. The third type of joint is used where both duct sections are externally insulated and is termed a hot frame to hot frame joint.

In all such joints, the inlet and outlet liners have end portions which overlap in a spaced apart relationship with the inlet liner underlying the outlet liner. The overlapping liner portions are interconnected in a manner permitting relative movement between them in directions parallel to the axis of the flow path through the joints when incorporated in exhaust systems.

A major objective of the invention is to provide a connection between a cold frame and the flange of a liner which will permit thermal growth of the flange relative to the frame and permit movement of the flange and liner relative to the flow path axis.

In the case of a joint which is circular in cross section, this objective is attained with the flange of a liner connected to a frame provided with a plurality of radial slots through which extend anchors fixed on the liner flange and which are so located that the position of the liner is fixed relative to the flow path but thermal growth in radial directions is permitted.

In the case of a joint which is rectangular in cross section, the objective is attained by forming the flanged liner in four sections with the flange of each section centrally anchored to the corresponding side of the frame. Corner clips slidably receive and retain the proximate ends of adjacent liner sections. In addition, between its anchor and its thus held ends, the flange of each section is slidably connected to a side of the frame by at least one guide consisting of a guide permitting thermal growth in directions lengthwise of the side of the frame to which it is anchored.

Another major objective of the invention is to provide hot frames capable of withstanding thermal stresses, an objective attained with each hot frame provided with structure having a wall which is spaced from and defines with the associated liner flange an inwardly opening channel which serves effectively to distribute heat uniformly to all surfaces of the channel. Such structure may also and preferably also establishes an oppositely opening channel receptive of external insulation.

Insulation, as shown in the accompanying drawings features a fiber glass blanket encased in a stainless steel, wire mesh sleeve with the width of the blanket so dimensioned that it may be folded to provide a central portion as an inner layer, and with the folded margins abutting to provide an outler layer. The blanket is anchored through its folds to the liners and is unified by interconnecting the wire mesh exposed where the outlerlayers abut.

Other objectives and the manner of their attainment will be apparent from the following description of preferred embodiments of the invention, the accompanying drawings and the appended claims.

BRIEF DESCRIPTION OF THE DRAWINGS

The accompanying drawings illustrate preferred embodiments of fabric expansion joints in accordance with the invention of which

FIG. 3A is a fragmentary view taken approximately along the indicated line 3A—3A of FIG. 3;

FIG. 6 is a section of the joint taken approximately along the indicated line 6—6 of FIG. 5; and FIG. 7 is a section similar to FIGS. 3 and 5 of a fabric expansion joint of the hot frame to hot frame type.

THE PREFERRED EMBODIMENTS

Figure 1:
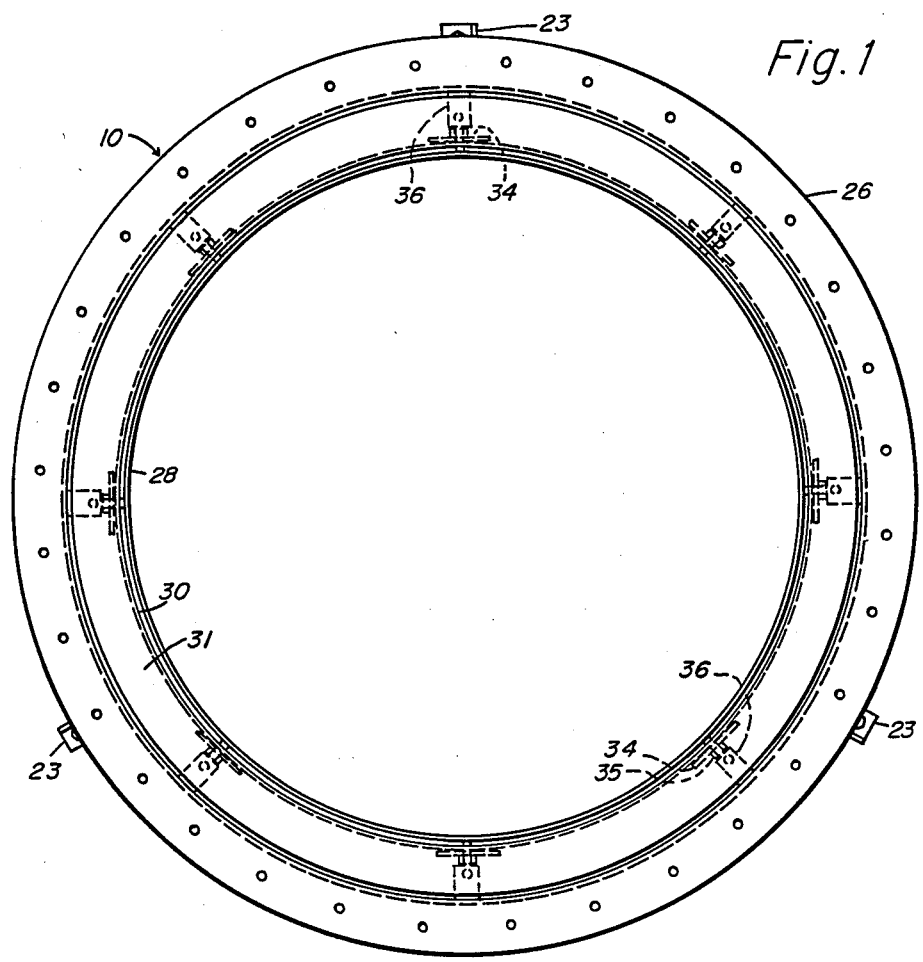
FIG. 1 is a view of a fabric expansion joint of the hot frame to cold frame type as seen from its outlet or downstream end.
Figure 2:
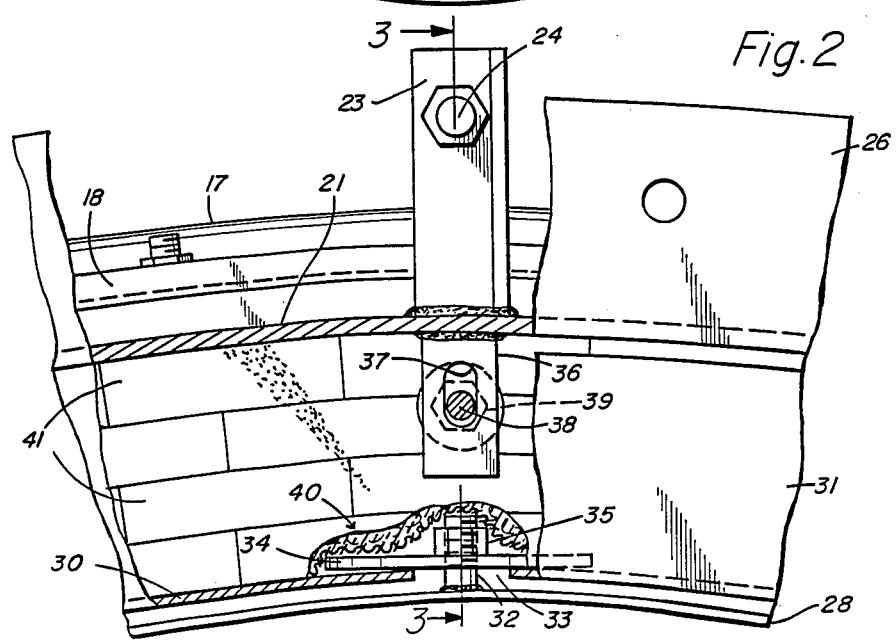
FIG. 2 is a fragmentary section, on a substantial increase in scale, of the outlet frame and outlet liner.
Figure 3:
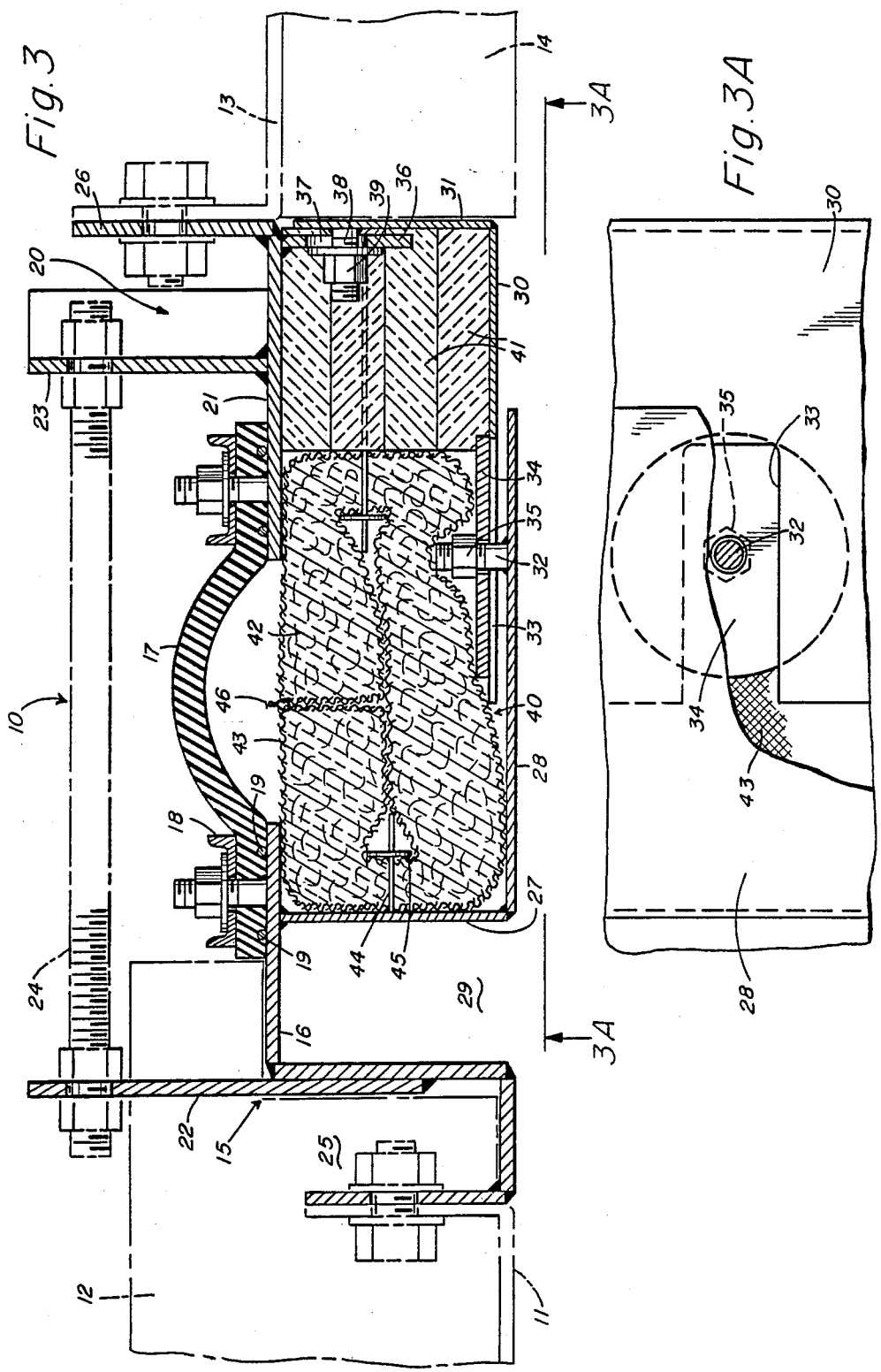
FIG. 3 is a section of the expansion joint taken approximately along the indicated line 3—3 of FIG. 2.

The fabric expansion joint illustrated by FIGS. 1–3A and generally indicated at 10 is for use where a duct section 11 of the exhaust system of a gas turbine, provided with external insulation 12, is to be connected to a duct section 13 having internal insulation 14, a hot frame to cold frame expansion joint.

The expansion joint 10, shown as circular in cross section, has an inlet frame, generally indicated at 15, which includes a mount 16. One margin of a composite fabric belt 17 is bolted through a clamping 18, between retainers 19 and against the mount 16. As shown, the channels 18 are sectioned.

The outlet frame of the joint 10 is generally indicated at 20 and includes a mount 21 to which the other margin of the belt 17 is similarly secured. The width of the belt 17 between its anchored margins is such that with the joint 10 installed in the exhaust system, lengthwise expansion of the joint is permitted. The inlet frame 15 is provided with arcuately spaced clips 22, typically three in number, and the outlet frame 20 has aligned clips 23. Corresponding clips of the two frames are interconnected by detachable tie rods 24 which hold the frames in the spaced apart relationship required for the installation of the joint in the exhaust system.

In order that the inlet frame 15 can be connected to the upstream duct section 11 it is provided with an outwardly opening, U-shaped channel 25 the upstream wall of which serves as a flange connectable to the duct section 11 and the other wall of which is welded to the mount 16. The channel 25 serves to connect the external insulation to the joint 10. The outlet frame 20 has an outwardly disposed flange 26 welded to the downstream margin of the mount 21 and is attachable to the flange of the duct section 13.

The flange 27 of the inlet liner 28 is welded to the mount 16 in a position so spacing it from the proximate wall of the channel 25 as to form an inwardly opening, U-shaped channel 29 having the important function of ensuring thermal distribution to the walls thereof.

The outlet liner 30, the flange 31 of which is connected to the mount 21 of the outlet frame 20 in a manner presently to be detailed, overlaps the inlet liner 28 in a spaced apart relationship. The overlapping ends of the liners 28 and 30 are interconnected by a series of circumferentially spaced studs 32 welded to the liner 28 and extending through similarly spaced, open ended slots 33 in the liner 30, through washers 34 and are anchored by nuts 35 in a manner permitting relative lengthwise movement between the liners. It will be noted that the width of the slots 33 is substantially greater than the diameter of the studs 22.

The flange 31 of the liner 30 is connected to clips 36 welded to the inner surface of the mount 21 close to the downstream margin thereof and spaced equal distances apart. The number of clips 36 in any joint is dependent on its dimensions and, in practise, the clips 36 are spaced two to three feet apart, by way of example and not of limitation. Each clip 36 has a radial slot 37 through which extends a stud 38 welded to the liner flange 31. Each stud 38 is slidably secured by a nut 39 threaded thereon and seated against a washer. From FIG. 1, it will be apparent that the thus connected liner flange 31 is held against movement relative to the axis of the flow path through the joint 10 while thermal growth in radial directions is permitted relative to the frame 20.

The fabric expansion joint 10 is effectively insulated by means of a unit, generally indicated at 40 and by blocks 41 of solid insulation lodged against the flange 31 and filling the major lengthwise portion of the space between the liner 30 and the mount 21 while the unit 40 fills the space between the blocks and the inlet liner flange 27.

The unit 40 is formed from a fiber glass blanket 42 confined in a stainless steel, wire mesh sleeves 43 of a width substantially twice the length of the width of the joint to be insulated thereby. The unit 40 is formed in situ by first seating a central portion of a blanket against the liners, 28 and 30, to form a first layer with marginal portions folded outwardly. The blanket is then held in place by anchoring pins 44 extending through the folds and provided with retainers 45. The anchoring pins 44, on the inlet side of the joint are welded to the inlet liner flange 27 and those on the outlet side are shown as carried by insulation blocks. It will be noted that the mount 21 overlies the fold through which the latter pins extend. The marginal portions of the blanket are then forced inwardly against the first layer until their faces abut to form a second layer. The unit 40 is completed by interconnecting the wire mesh sleeve exposed adjacent the abutting edges by wire as at 46. The joint 10 is then completed by installing the belt 17 and by adding the tie rods 24.

Figure 4:
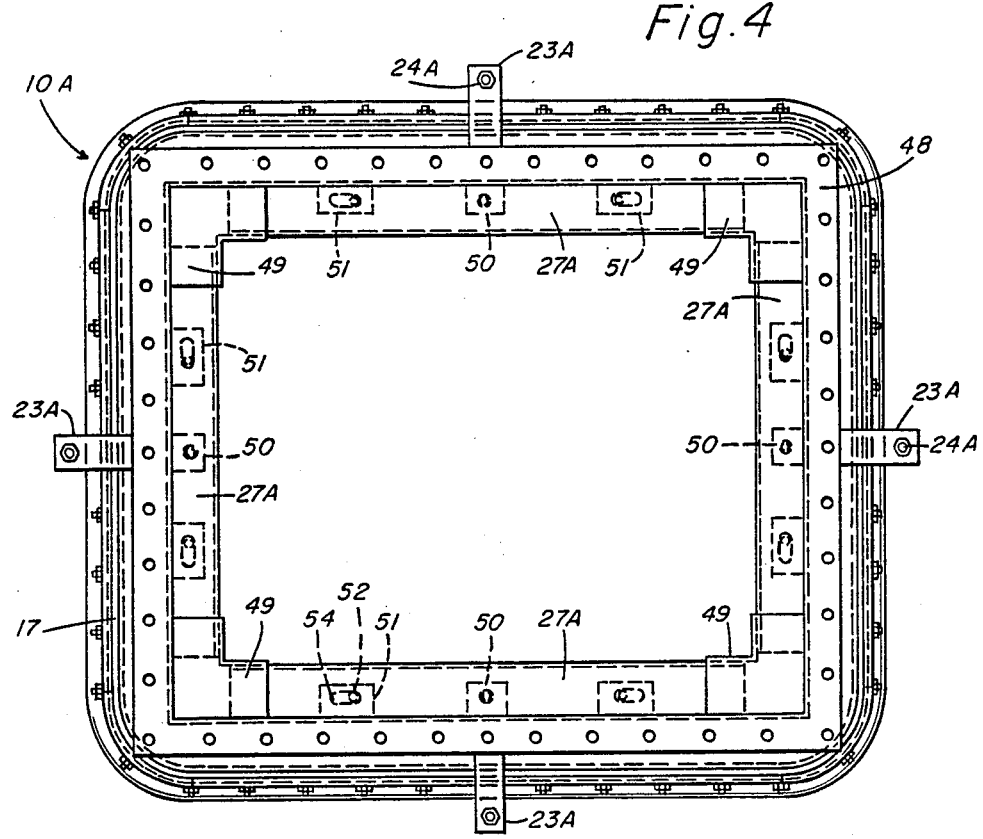
FIG. 4 is a view of a fabric expansion joint of the cold frame to cold frame type as seen from its outlet or downstream end.
Figure 5:
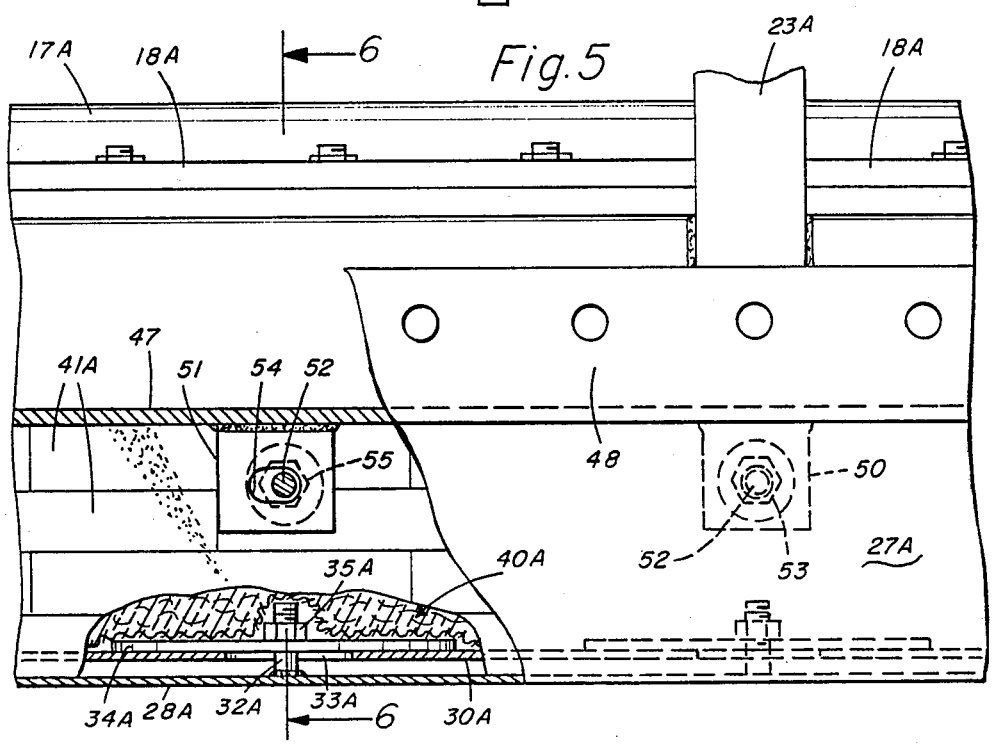
FIG. 5 is a fragmentary section, on an increase in scale, of the outlet frame and the outlet liner.

The fabric expansion joint illustrated by FIGS. 4–6 is of the cold frame to cold frame type as both duct sections which it is to connect are internally insulated. Except where parts corresponding in function to those described in connection with the expansion joint 10 are of a different construction and thus require description, like reference numerals are employed to designate corresponding parts and these are distinguished by the suffix addition "A".

The fabric expansion joint 10A is rectangular in cross section as are the identical inlet and outlet duct sections 13A. It should be noted that any of the three types of fabric expansion joints herein discussed may be either circular of rectangular in cross section.

The inlet and outlet frames 15A and 20A are also identical with their respective mounts 16A and 21A provided with U-shaped channels 47 having their outer walls 48 serving as flanges attachable to the end flanges of the duct sections to be connected by the joint 10A.

The liners 28A and 30A are rectangular and identical. Each liner and its flange consists of four side sections joined by corner clips 49 in a manner slidably holding the proximate ends of the adjacent sections. The clips 49 are welded to the closed ends of the channels 47 substantially in the plane of the channel walls 48. Also welded to the closed end of each channel 47 is a series of clips of which a clip 50 is located centrally of each ise of each frame and at least one clip 51 is located between the clip 50 and each corner clip 49. As, in practise, the clips are spaced two to three feet apart. The number of clips 51 depends on the dimensions of the frames and liners.

The liner flanges 27A and 31A have studs 52 welded thereto and so spaced and positioned that there is one for each clip. Each central clip receives a stud 52 and when that stud is secured by a nut 53 threaded thereon against a washer, an anchor is established locking the center of a liner flange to the appropriate one of the frame sides.

The clips 51 have slots 54 extending lengthwise of the side of each flange of a liner section through which studs 52 freely extend and which are secured to the appropriate clip 51 by nuts 55 threaded thereon against washers then to establish guides permitting thermal growth of each thus connected liner in directions lengthwise of the side of the frame to which it is connected without changing the relationship of that liner section relative to the flow axis through the joint 10A.

Since the liners 15A and 20A are connected in the previously described manner, lengthwise thermal growth of the liner sections is permitted and their lateral growth accommodated.

Insulation of the joint 10A is effected by seating a unit 40A against the central portion of the liners with its margins against lengths 41A of solid insulation lodged between each channel 47 and the subjacent liner section and butted against the end flange thereof. The anchoring pins 44 are all shown as held by the solid insulation.

In FIG. 7, both duct sections are shown as externally insulated so that the required fabric expansion joint is of the hot frame to hot frame type. As both the inlet and outlet frames and the inlet and outlet liners are or may be identical to the inlet frame and inlet liner shown in FIGS. 1–3A, they will not again be detailed. Corresponding parts are designated by the same reference numerals distinguished by the suffix addition "B".

While the construction and functioning of the joint 10B is apparent from the description of the frame 10 and the liner 28 of the joint 10, it will be noted that a function of the joint 10B is in connecting the external insulation 12B thereto by means of the channels 25. The liner flange 27B and the liner flange 31B are welded to the appropriate one of the mounts 16B and 21B and the joint 10B may be either circular or rectangular in cross section.

From the foregoing, it will be apparent that fabric expansion joints in accordance with the invention are well adapted to meet its stated objectives.

I claim:

1. An expansion joint to be incorporated between inlet and outlet sections of the exhaust system of a gas turbine, at least the inlet section provided with external insulation having a flanged end, said joint including inlet and outlet frames attachable to the ends of said sections, a flexible belt marginally sealed to said frames and dimensioned to permit relative axial and lateral movement between them when the joint connects said sections, inlet and outlet liners, each liner having an end flange, means connecting each flange to the appropriate frame, the liners having end portions which overlap in a spaced apart relationship with the inlet liner underlying the outlet liner with respect to the flow path through the joint, means interconnecting said end portions in a manner permitting relative axial and lateral movements of the liners, insulation overlying the liners and butted against their flanges, at least the inlet frame including structure providing a wall spaced from the flange of the liner connected thereto and defining with said flange an inwardly opening thermal distribution channel shaped and dimensioned to fit the flanged end of the insulation with the insulation overlying the closed end of the channel.

2. The expansion joint of claim 1 in which the outlet section also is provided with external insulation having a flange end, and the outlet frame also includes structure providing a wall spaced from the flange of the liner connected thereto and defining with said flange an inwardly opening thermal distribution channel shaped and dimensioned to fit the flanged end of the insulation with the insulation overlying the closed end.

3. The expansion joint of claim 2 in which the outlet frame structure includes an outwardly opening end channel the free end of which is for use in connecting the outlet frame to the outlet section.

4. The expansion joint of claim 1 in which the inlet frame structure includes an outwardly opening end channel the free end of which is for use in connecting the inlet frame to the inlet section.

5. The expansion joint of claim 1 in which the outlet section is provided with internal insulation, the means connecting the outlet frame and the associated end flange is of a type permitting thermal growth of the end flange relative to the outlet frame in a plane intersecting the flow path through the path without the axis of the outlet frame shifting relative to the flow path axis, the end flange is positioned to butt against the insulation when the outlet frame is installed and the outlet frame has an external flange in the plane of the outlet end flange for use in connecting the outlet frame to the outlet section.

6. The expansion joint of claim 1 in which the means interconnecting said end portions includes the overlying one of the overlapping portions having a slot of substantial width, a washer covers the slot, the underlying portion includes a stud of a diameter less than the width and length of the slot and extending outwardly therethrough, and a nut threaded on the stud is seated against the washer.

7. The expansion joint of claim 1 in which the insulation overlying the liners includes a fibreglass sleeve consisting of a fibreglass blanket confined in a stainless steel wire mesh, the sleeve of a width sufficiently enough greater than the distance between the flanges to be insulated thereby to provide an inner layer fitted against the liners and folded over margins which abut to provide an outer layer, anchoring means carried by the flanges extending through the folds of the sleeve, and means interconnecting the wire mesh at the abutting ends.

8. The expansion joint of claim 16 in which the means sealing the margins of the belt to the frames include, for each margin, a clamping channel consisting of sections, a pair of parallel retainers extend about the periphery of each frame, each margin of the belt is between the channel sections and the retainers of one of the frames, a series of studs spaced between the retainers, and spaced about the periphery of each frame extend through the appropriate one of the margins, the channel sections and between the ends thereof, a washer is on each stud, and nuts are threaded on the studs thereby to anchor the channel sections to the underlying margin and the underlying margin against the retainers and the frame.

9. The expansion joint of claim 8 in which the width of the channel sections is such that the margins thereof overlie the retainers and the nuts and washers are confied by the walls of the channels.

10. An expansion joint to be incorporated between inlet and outlet sections of the exhaust system of a gas turbine, at least the outlet section provided with internal insulation, said joint including inlet and outlet frames provided with attaching portions connectable to the ends of said sections, at least the attaching portions connectable to the ends of said sections, at least the attaching portion of the outlet frame including an outwardly extending marginal flange, a flexible belt marginally sealed to said frames and dimensioned to permit relative axial and lateral movement between them when the joint connects said sections, inlet and outlet liners, each liner having and end flange, means connecting each flange to the appropriate frame, the liners having end portions which overlap in a spaced apart relationship with the inlet liner overlying the outlet liner with respect to the flow path through the joint, means interconnecting said end portions in a manner permitting relative axial and lateral movement of the liners, insulation overlying the liners and butted against their flanges and the means connecting at least the end flange of the outlet liner to the outlet frame of a type permitting thermal growth of said flange relative to said frame in a plane intersecting the flow path through the joint without the axis of the joint shifting relative to said flow path and said outlet flange butted against the internal insulation.

11. The expansion joint of claim 10 in which the inlet section is also provided with internal insulation, the means connecting the flange of the inlet liner to the inlet frame are identical to the means connecting the flange of the outlet liner to the outlet frame and the inlet flange butts against the insulation of the inlet section.

12. The expansion joint of claim 10 in which the frames and outlet liners are circular, said means connecting at least the end flange of the outlet liner to the outlet frame includes anchors fixed on the flange of the outlet liner and the outlet frame includes inwardly disposed clips having radial slots, one for each anchor through which the appropriate one of the anchors extends.

13. The expansion joint of claim 12 in which the clips are so spaced relative to the downstream margin of the outlet frame as to place the attached liner flange in the plane of the flange of the outlet frame.

14. The expansion joint of claim 10 in which the outlet frame and outlet liner are rectangular, the liner consists of flanged sections and right angular clips slidably receiving and retaining the proximate ends of adjacent sections and welded to the frame, said means connecting at least the end flange of the outlet liner to the outlet frame includes one anchor connecting the flange of each section to the outlet frame, and guides between the anchors and adjacent clips, each guide slidably connects one of the flanges to one side of the frame and permits thermal growth in a direction parallel to said one frame side.

15. The expansion joint of claim 14 in which the sections are sides of the outlet liner, the clips are corners of the flange and each anchor is midway of each side of the liner flange.

16. The expansion joint of claim 14 in which the clips are so spaced relative to the downstream margin of the outlet frame as to place the attached liner flange in the plane of the flange of the outlet frame.

17. The expansion joint of claim 14 in which there are a plurality of guides between each anchor and each clip and the distance between them is in the approximate range of two to three feet.

* * * * *